(12) United States Patent
Glovier

(10) Patent No.: US 12,484,469 B2
(45) Date of Patent: Dec. 2, 2025

(54) SYSTEM AND METHOD FOR DETECTING DISK GANG PLUGGING ON A TILLAGE IMPLEMENT

(71) Applicant: CNH Industrial America LLC, New Holland, PA (US)

(72) Inventor: Scott Glovier, Lombard, IL (US)

(73) Assignee: CNH Industrial America LLC, New Holland, PA (US)

( * ) Notice: Subject to any disclaimer, the term of this patent is extended or adjusted under 35 U.S.C. 154(b) by 774 days.

(21) Appl. No.: 17/837,533

(22) Filed: Jun. 10, 2022

(65) Prior Publication Data

US 2023/0397520 A1 Dec. 14, 2023

(51) Int. Cl.
| | | |
|---|---|---|
| A01B 79/00 | (2006.01) | |
| A01B 35/16 | (2006.01) | |
| A01B 35/32 | (2006.01) | |
| G01L 5/16 | (2020.01) | |

(52) U.S. Cl.
CPC ............ *A01B 79/005* (2013.01); *A01B 35/16* (2013.01); *A01B 35/32* (2013.01); *G01L 5/16* (2013.01)

(58) Field of Classification Search
CPC ....... A01B 79/005; A01B 35/16; A01B 35/32; A01B 33/12; A01B 15/16; A01B 23/06; A01B 71/08; G01L 5/16
See application file for complete search history.

(56) References Cited

U.S. PATENT DOCUMENTS

| | | |
|---|---|---|
| 4,677,542 A | 6/1987 | Kasten |
| 8,406,966 B2 | 3/2013 | Schedgick et al. |
| 9,271,439 B2 | 3/2016 | Bourgault et al. |
| 9,485,900 B2 | 11/2016 | Connell et al. |
| 10,492,353 B2 | 12/2019 | Kovach et al. |
| 10,820,490 B2 | 11/2020 | Schoeny et al. |
| 11,202,403 B2 | 12/2021 | Smith |

(Continued)

FOREIGN PATENT DOCUMENTS

| | | |
|---|---|---|
| EP | 0713637 | 5/1996 |

OTHER PUBLICATIONS

Ahmadi "A draft force estimator for disc harrow using the laws of classical soil mechanics" (Year: 2018).*

(Continued)

*Primary Examiner* — Faris S Almatrahi
*Assistant Examiner* — Dana F Artimez
(74) *Attorney, Agent, or Firm* — Dority & Manning, P.A.

(57) ABSTRACT

A tillage implement includes a plurality of disk gangs, with each disk gang including a shaft and a plurality of disks spaced apart from each other along the shaft. Furthermore, the tillage implement includes a plurality of load sensors configured to generate data indicative of loads being applied to the plurality of disk gangs and a computing system communicatively coupled to the plurality of sensors. In this respect, the computing system is configured to determine a total load being applied to each disk gang based on the data generated by the plurality of load sensors. Additionally, the computing system is configured to determine an average load per disk being applied to each disk gang based on the determined total loads. Moreover, the computing system is configured to determine a plug status value for each disk gang based on the determined average loads per disk.

14 Claims, 6 Drawing Sheets

(56) References Cited

U.S. PATENT DOCUMENTS

| | | | |
|---|---|---|---|
| 2014/0116735 A1* | 5/2014 | Bassett | A01C 7/203 |
| | | | 172/430 |
| 2020/0305335 A1 | 10/2020 | Schoeny et al. | |
| 2021/0029865 A1* | 2/2021 | Smith | A01B 76/00 |
| 2021/0045278 A1* | 2/2021 | Henry | A01B 9/003 |
| 2021/0108951 A1* | 4/2021 | Smith | A01B 25/00 |
| 2021/0112699 A1* | 4/2021 | Stanhope | A01C 5/064 |
| 2021/0123728 A1* | 4/2021 | Smith | A01B 15/16 |
| 2021/0153420 A1* | 5/2021 | Smith | A01B 79/005 |
| 2022/0198642 A1* | 6/2022 | Sharma | G06N 20/00 |

OTHER PUBLICATIONS

European Extended Search Report Corresponding to EP23178487 on Nov. 9, 2023.
Serrano et al., "Tractor Energy Requirements in Disc Harrow Systems," Biosystems Engineering 98 (2007) 286-296, dated Sep. 20, 2007, (12 pages) https://www.researchgate.net/publication/248597942_Tractor_energy_requirements_in_disc_harrow_systems.

\* cited by examiner

SYSTEM AND METHOD FOR DETECTING DISK GANG PLUGGING ON A TILLAGE IMPLEMENT

FIELD OF THE INVENTION

The present disclosure generally relates to tillage implements and, more particularly, to systems and methods for detecting disk gang plugging on a tillage implement.

BACKGROUND OF THE INVENTION

It is well known that, to attain the best agricultural performance from a field, a farmer must cultivate the soil, typically through a tillage operation. Modern farmers perform tillage operations by pulling a tillage implement behind an agricultural work vehicle, such as a tractor. In certain configurations, tillage implements include one or more disk gangs supported on its frame. Each disk gang, in turn, includes a plurality of spaced apart disks that are configured to rotate relative to the soil as the tillage implement travels across the field. The rotation of the disks loosens and/or otherwise agitates the soil to prepare the field for subsequent planting operations.

During tillage operations, field materials, such as residue, soil, rocks, and/or the like, may become trapped or otherwise accumulate between adjacent pairs of disks. When such accumulations of field materials become sufficient to prevent a disk gang from providing adequate tillage to the field (e.g., by slowing or preventing rotation of the disks), the disk gang is plugged. In such instances, it is necessary for the operator to take certain corrective actions to remove the accumulated field materials. However, it may be difficult for the tillage implement operator to determine when a disk gang is plugged. In this respect, systems have been developed to detect plugging of disk gangs during tillage operations. While such systems work well, further improvements are needed.

Accordingly, an improved system and method for detecting disk gang plugging on a tillage implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a tillage implement. The tillage implement includes a frame and a plurality of disk gangs supported on the frame, with each disk gang having a shaft and a plurality of disks spaced apart from each other along the shaft. Furthermore, the tillage implement includes a plurality of load sensors configured to generate data indicative of loads being applied to the plurality of disk gangs and a computing system communicatively coupled to the plurality of sensors. In this respect, the computing system is configured to determine a total load being applied to each disk gang based on the data generated by the plurality of load sensors. Additionally, the computing system is configured to determine an average load per disk being applied to each disk gang based on the determined total loads. Moreover, the computing system is configured to determine a plug status value for each disk gang based on the determined average loads per disk.

In another aspect, the present subject matter is directed to a system for detecting disk gang plugging on a tillage implement. The system includes an implement frame and a plurality of disk gangs supported on the implement frame, with each disk gang having a shaft and a plurality of disks spaced apart from each other along the shaft. In addition, the system includes a plurality of load sensors configured to generate data indicative of loads being applied to the plurality of disk gangs and a computing system communicatively coupled to the plurality of sensors. As such, the computing system is configured to determine a total load being applied to each disk gang based on the data generated by the plurality of load sensors. Furthermore, the computing system is configured to determine an average load per disk being applied to each disk gang based on the determined total loads. Additionally, the computing system is configured to determine a plug status value for each disk gang based on the determined average loads per disk.

In a further aspect, the present subject matter is directed to a method for detecting disk gang plugging on a tillage implement. The tillage implement, in turn, includes a plurality of disk gangs, with each disk gang having a plurality of disks. The method includes receiving, with a computing system, load sensor data indicative of loads acting on the plurality of disk gangs. Moreover, the method includes determining, with the computing system, a total load being applied to each disk gang based on the received load sensor data. In addition, the method includes determining, with the computing system, an average load per disk being applied to each disk gang based on the determined total loads. Furthermore, the method includes determining, with the computing system, a plug status value for each disk gang based on the determined average loads per disk. Additionally, the method includes initiating, with the computing system, a control action based on the determined plug status values.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
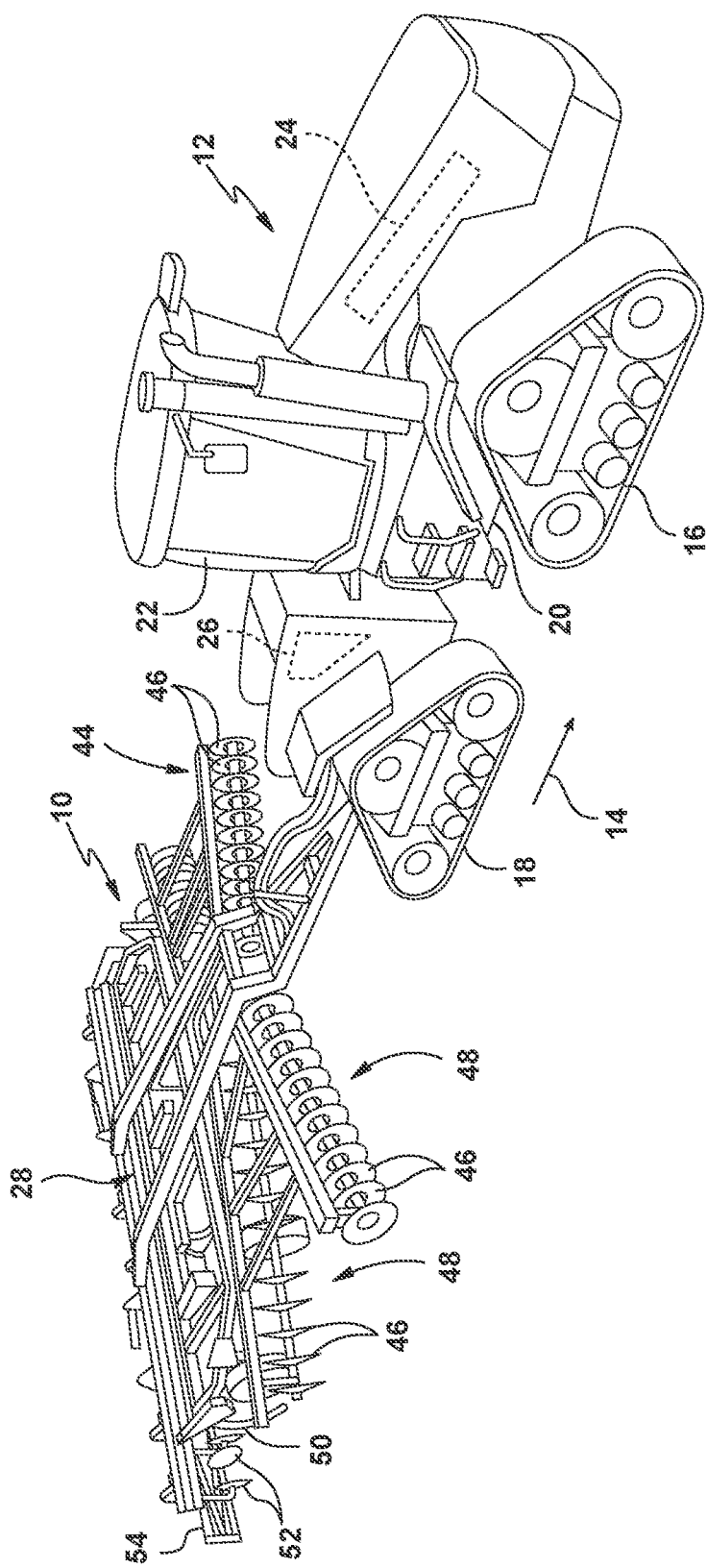
FIG. 1 illustrates a perspective view of one embodiment of a tillage implement coupled to a work vehicle in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for detecting disk gang plugging on a tillage implement. As will be described below, the tillage implement generally includes a plurality of disk gangs supported on its frame. Each disk gang, in turn, includes a shaft and a plurality of disks spaced apart from each other along the length of the shaft such that a flow zone is defined between each pair of adjacent disks. In this respect, as the tillage implement travels across the field to perform a tillage operation thereon, the disks rotate relative to the soil such that field materials (e.g., soil, residue, rocks, etc.) flow through the flow zones. However, when a sufficient amount of field materials accumulates within one or more flow zones of a disk gang, the operation of the disk gang may be impacted. In such instances, the disk gang is considered plugged.

In several embodiments, a computing system of the disclosed system is configured to detect plugging of the disk gangs based on the loads acting on the disk gangs. More specifically, the computing system receives load sensor data indicative of the loads acting on the disk gangs, such as due to engagement with the soil. Furthermore, the computing system determines the total load being applied to each disk gang based on the received load sensor data. Additionally, the computing system determines the average load per disk being applied to each disk gang based on the determined total loads. For example, when determining the average load per disk, the computing system may apply a correction factor based on the number and/or relative sizing of the disks. Moreover, the computing system determines a plug status value for each disk gang based on the determined average loads per disk. The plug status value is, in turn, indicative of the likelihood that the corresponding disk gang is plugged. In some embodiments, the penetration depth of the disks may also be used to determine the plug status values. Thereafter, the computing system may initiate a control action(s) based on the determined plug status values. Such control action(s) may include providing a notification to the operator, adjusting the ground speed of the tillage implement, adjusting the positions of one or more the disk gangs relative to the implement frame, and/or the like.

Using the average load per disk to determine a plug status value for a disk gang improves the operation of the tillage implement. More specifically, as the load being applied to a disk gang increases, the likelihood of that disk gang being plugged similarly increases. However, the draft load on a disk gang alone does not account for the number and/or sizes of the disks on that disk gang. Instead, as described above, the disclosed system and method use the average load per disk to determine a plug status value for each disk gang. Thus, with the disclosed system and method, the loads acting on the different disk gangs can be normalized based on the size and the number of disks thereon to provide for more accurate detection of plugging.

Figure 2:
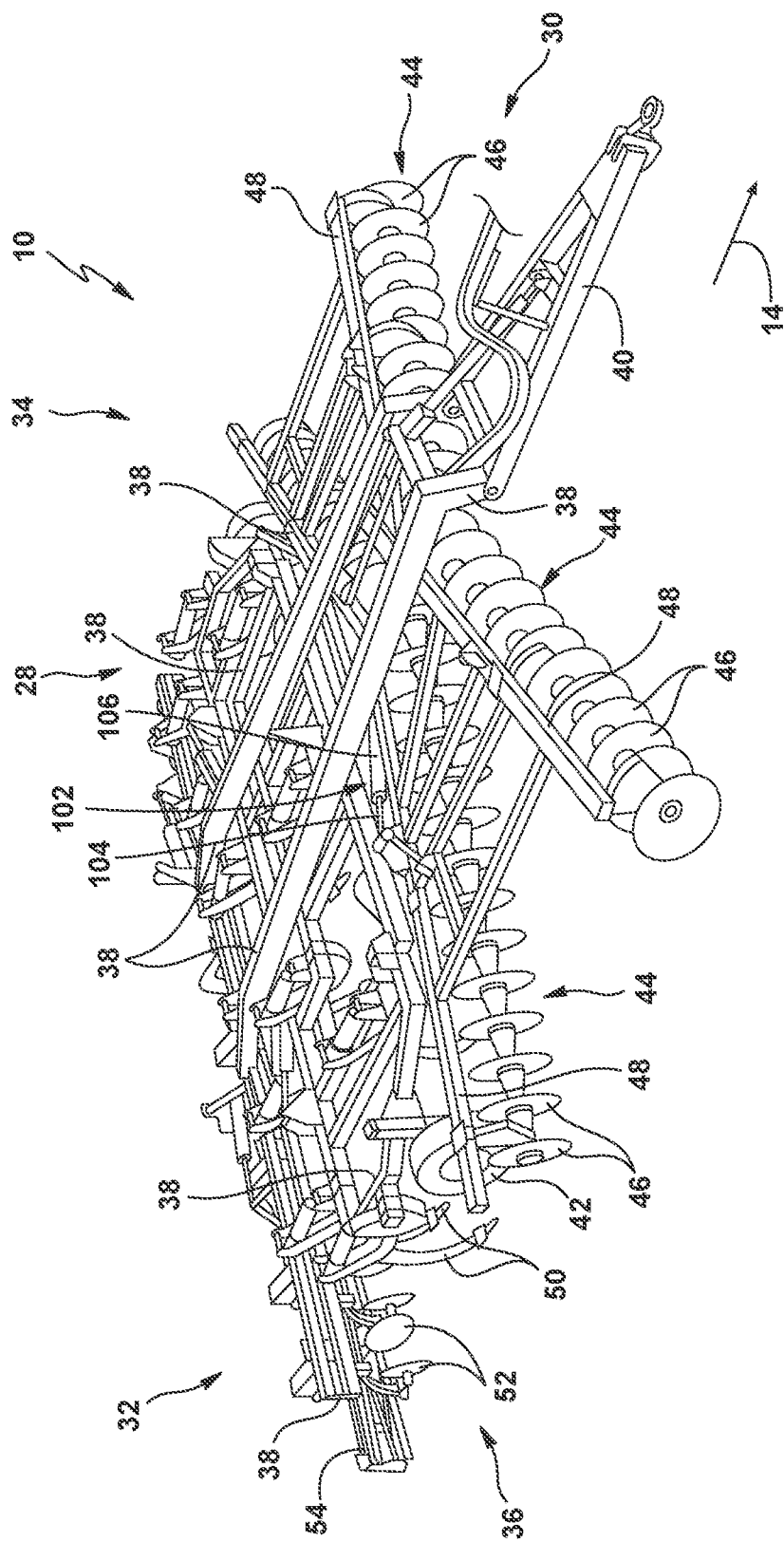
FIG. 2 illustrates an alternative perspective view of the tillage implement shown in FIG. 1, particularly illustrating various components of the tillage implement.

Referring now to the drawings, FIGS. 1 and 2 illustrate differing perspective views of one embodiment of a tillage implement 10 in accordance with aspects of the present subject matter. Specifically, FIG. 1 illustrates a perspective view of the tillage implement 10 coupled to a work vehicle 12. Additionally, FIG. 2 illustrates a perspective view of the implement 10, particularly illustrating various components of the implement 10.

In general, the implement 10 may be configured to be towed across a field in a direction of travel (e.g., as indicated by arrow 14 in FIG. 1) by the work vehicle 12. As shown, the implement 10 is configured as a disk ripper, and the work vehicle 12 is configured as an agricultural tractor. However, in other embodiments, the implement 10 may be configured as any other suitable type of tillage implement. Similarly, the work vehicle 12 may be configured as any other suitable type of vehicle.

As shown in FIG. 1, the work vehicle 12 may include a pair of front track assemblies 16, a pair or rear track assemblies 18, and a frame or chassis 20 coupled to and supported by the track assemblies 16, 18. An operator's cab 22 may be supported by a portion of the chassis 20 and may house various input devices (e.g., a user interface 120 shown in FIG. 6) for permitting an operator to control the operation of one or more components of the work vehicle 12 and/or one or more components of the implement 10. Additionally, the work vehicle 12 may include an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) (or via axles if multiple drive axles are employed).

As shown in FIGS. 1 and 2, the implement 10 may include a frame 28. More specifically, the frame 28 may extend longitudinally between a forward end 30 and an aft end 32. The frame 28 may also extend laterally between a first side 34 and a second side 36. In this respect, the frame 28 generally includes a plurality of structural frame members 38, such as beams, bars, and/or the like, configured to support or couple to a plurality of components. Furthermore, a hitch assembly 40 may be connected to the frame 28 and configured to couple the implement 10 to the work vehicle 12. Additionally, a plurality of wheels 42 (one is shown) may be coupled to the frame 28 to facilitate towing the implement 10 in the direction of travel 14.

In several embodiments, the frame 28 may be configured to support one or more gangs or sets 44 of disks 46. Each disk 46 may, in turn, be configured to penetrate into or otherwise engage the soil as the implement 10 is being pulled through the field. In this regard, the various disk gangs 44 may be oriented at an angle relative to the direction of travel 14 to promote more effective tilling of the soil. In the embodiment shown in FIGS. 1 and 2, the implement 10 includes four disk gangs 44 supported on the frame 28 adjacent to its forward end 30. However, in alternative embodiments, the implement 10 may include any other suitable number of disk gangs 44, such as more or fewer than four disk gangs 44. Furthermore, in one embodiment, the disk gangs 44 may be mounted to the frame 28 at any other suitable location, such as adjacent to its aft end 32.

Moreover, in several embodiments, the implement 10 may include a plurality of disk gang actuators 102 (one is shown). In general, each actuator 102 is configured to move or otherwise adjust the orientation or position of one of the disk gangs 44 relative to the implement frame 28. For example, as shown in the illustrated embodiment, a first end of each actuator 102 (e.g., a rod 104 of the actuator 102) is be coupled to a support arm 48 of the corresponding disk gang 44, while a second end of each actuator 102 (e.g., the cylinder 106 of the actuator 102) is coupled to the frame 28. The rod 104 of each actuator 102 may be configured to extend and/or retract relative to the corresponding cylinder 106 to adjust the angle of the corresponding disk gang 44 relative to a lateral centerline (not shown) of the frame 28 and/or the penetration depth of the associated disks 46. In the illustrated embodiment, each actuator 102 corresponds to a fluid-driven actuator, such as a hydraulic or pneumatic cylinder. However, each actuator 102 may correspond to any other suitable type of actuator, such as an electric linear actuator.

Additionally, as shown, in one embodiment, the implement frame 28 may be configured to support other ground engaging tools. For instance, in the illustrated embodiment, the frame 28 supports a plurality of shanks 50 configured to rip or otherwise till the soil as the implement 10 is towed across the field. Furthermore, in the illustrated embodiment, the frame 28 also supports a plurality of leveling blades 52 and rolling (or crumbler) basket assemblies 54. However, in other embodiments, any other suitable ground-engaging tools may be coupled to and supported by the implement frame 28, such as a plurality closing discs.

Figure 3:
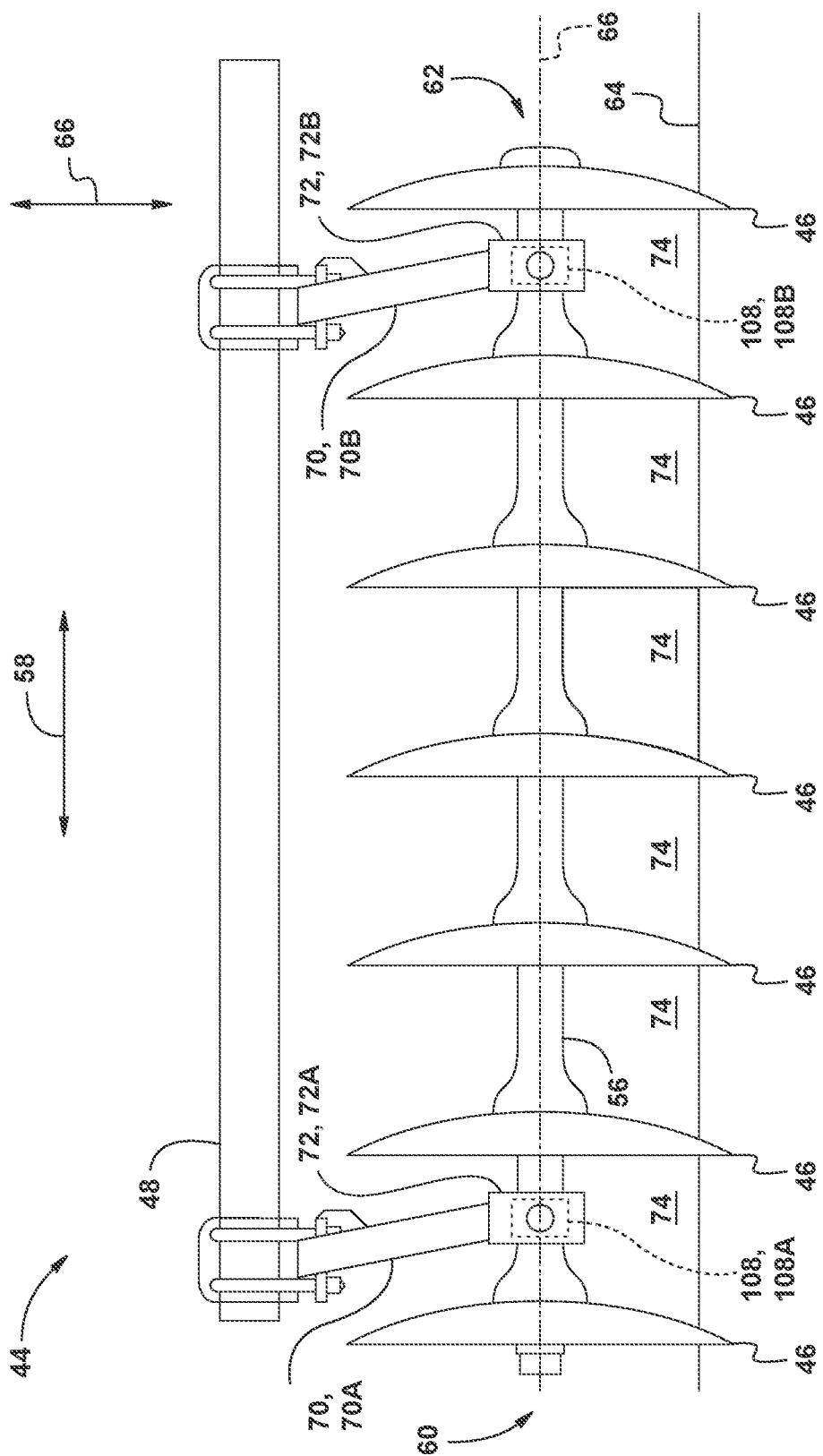
FIG. 3 illustrates a front view of one embodiment of a disk gang of a tillage implement in accordance with aspects of the present subject matter.

Referring now to FIG. 3, a front view of one embodiment of a disk gang 44 of the implement 10 is illustrated in accordance with aspects of the present subject matter. Specifically, in several embodiments, the disk gang 44 may include a disk gang shaft 56 that extends along an axial direction or length of the disk gang 44 (e.g., as indicated by arrow 58 in FIG. 3) between a first end 60 and a second end 62. As shown, the disks 46 are coupled to the disk gang shaft 56 and spaced apart from each other along the axial direction 58. As the implement 10 is moved across a field, the disks 46 may be configured to penetrate the soil surface (e.g., as indicated by line 64 in FIG. 3) of the field and rotate about an axis of rotation (e.g., as indicated by dashed line 66 in FIG. 3) relative to the soil within the field.

In general, the disk gang 44 is supported relative to the corresponding support arm 48 of the tillage implement 10. Specifically, in several embodiments, a pair of hangers 70 (e.g., C-hangers) support the disk gang 44 at a position below the support arm 48. For example, in one embodiment, one end of each hanger 70 may be coupled to the support arm 48, while the opposing end of each hanger 70 is coupled to a bearing block 72. The bearing blocks 72, in turn, are rotatably coupled to the disk gang shaft 56. However, in alternative embodiments, the disk gang 44 may have any other suitable configuration.

As shown in FIG. 3, the disk gang 44 defines a plurality of more flow zones 74 through which field materials may flow during the operation of the implement 10. Specifically, in several embodiments, each flow zone 74 may be defined directly between a pair of adjacent disks 46 in the axial direction 58. In this respect, as the implement 10 travels across the field, field materials (e.g., soil, residue, rocks, and/or the like) may flow through the flow zone 74 as such field materials are being tilled or otherwise processed by the disks 46. During normal, non-plugged operation of the disk gang 44, substantially all of the field materials being processed by the disk gang 44 flow through the flow zones 74, with only minimal field materials like becoming trapped or otherwise accumulating within the flow zones 74. However, when a sufficient amount of field materials accumulates with one or more of the flow zones 74 such that rotation of the disks 46 is impacted (e.g., the rotational speed of the disks 46 is reduced or the disks 46 stop rotating), the disk gang 44 is considered plugged.

The configuration of the tillage implement 10 and the work vehicle 12 described above and shown in FIGS. 1-3 is provided only to place the present subject matter in an exemplary field of use. Thus, the present subject matter may be readily adaptable to any manner of implement and/or vehicle configuration.

Furthermore, a plurality of load sensors 108 are installed on the tillage implement 10. In general, the load sensors 108 are configured to generate data indicative of loads being applied to the plurality of disk gangs 44 during a tillage operation. Such loads result from engagement between the disks 46 and the soil into which the disks 46 have penetrated. As will be described below, the data generated by the load sensors 108 is, in turn, be used to detect when one or more of the disk gangs 44 are plugged. Specifically, in several embodiments, each disk gang 44 on the implement 10 includes a pair of load sensors 108. For example, in the embodiment illustrated in FIG. 3, the disk gang 44 includes a first load sensor 108A coupled between a first hanger 70A and the disk gang shaft 56 and a second load sensor 108B coupled between a second hanger 70B and the disk gang shaft 56. In one embodiment, the first and second load sensors 108A, 108B may be positioned within first and second bearing blocks 72A, 72B coupled between the disk gang shaft 56 and the first and second hangers 70A, 70B, respectively. The load sensors 108 may correspond to any suitable sensing devices configured to generate data indicative of the loads acting on the disk gangs 44, such as load cells, strain gauges, and/or the like.

Figure 4:
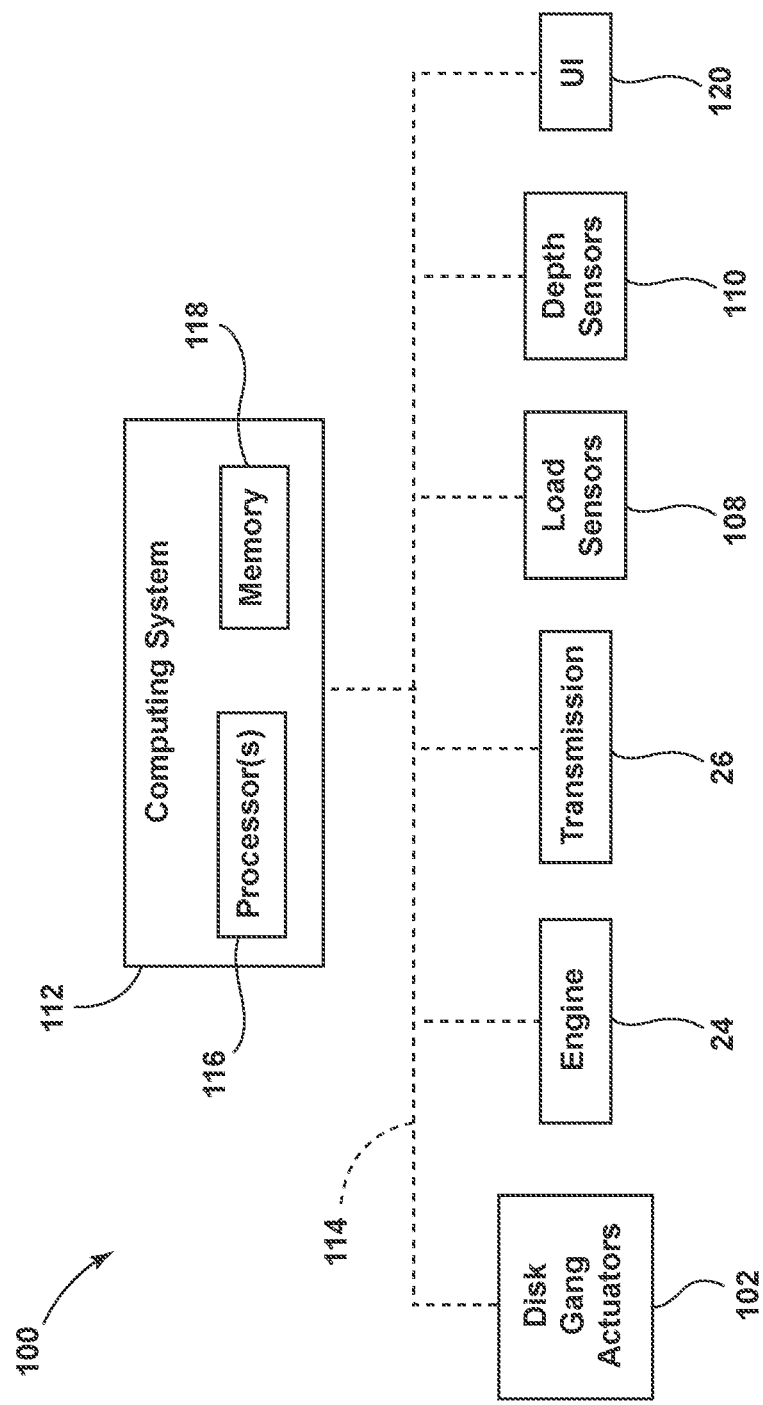
FIG. 4 illustrates a schematic view of one embodiment of a system for detecting disk gang plugging on a tillage implement in accordance with aspects of the present subject matter.

Referring now to FIG. 4, a schematic view of one embodiment of a system 100 for detecting disk gang plugging on a tillage implement is illustrated in accordance with aspects of the present subject matter. In general, the system 100 will be described herein with reference to the tillage implement 10 and the work vehicle 12 described above with reference to FIGS. 1-3. However, the disclosed system 100 may generally be utilized with tillage implements having any other suitable implement configuration and/or with work vehicles having any other suitable vehicle configuration.

As shown in FIG. 4, the system 100 generally includes one or more components of the tillage implement 10 and/or the work vehicle 12. For example, in the illustrated embodiment, the system 100 includes the engine 24 and the transmission 26 of the work vehicle 12 and the disk gang actuators 102 and the force sensors 108 of the tillage implement 10.

Additionally, the system 100 may include a plurality of depth sensors 110 of the tillage implement 10. In general, each depth sensor 110 is configured to generate data indicative of depths to which the disks 46 of one of the disk gangs 44 penetrate into the soil during a tillage operation. As will be described below, this depth sensor data may be used in addition to the load sensor data to detect when one or more of the disk gangs 44 are plugged. For example, in one embodiment, the depth sensor 110 may correspond to linear potentiometers configured to measure the extension/retraction of the rods 104 of the disk gang actuators 102. Such extension/retraction of the rods 104 can then be used to determine the penetration depth of the disks 46 on the corresponding disk gang 44. However, in alternative embodiments, the depth sensors 110 may have any other suitable configuration.

Moreover, the system 100 includes a computing system 112 communicatively coupled to one or more components of the tillage implement 10, the work vehicle 12, and/or the system 100 to allow the operation of such components to be electronically or automatically controlled by the computing system 112. For instance, the computing system 112 may be communicatively coupled to the load sensors 108 and/or the depth sensors 110 via a communicative link 114. As such, the computing system 112 may be configured to receive data from the sensors 108, 110. Furthermore, the computing system 112 may be communicatively coupled to the engine 24, the transmission 26, and/or the disk gang actuators 102 via the communicative link 114. In this respect, the computing system 112 may be configured to control the operation of the components 24, 26, 102. In addition, the computing system 112 may be communicatively coupled to any other suitable components of the implement 10, the vehicle 12, and/or the system 100.

In general, the computing system 112 may comprise one or more processor-based devices, such as a given controller or computing device or any suitable combination of controllers or computing devices. Thus, in several embodiments, the computing system 112 may include one or more processor(s) 116 and associated memory device(s) 118 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 118 of the computing system 112 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 118 may generally be configured to store suitable computer-readable instructions that, when implemented by the processor(s) 116, configure the computing system 112 to perform various computer-implemented functions, such as one or more aspects of the methods and algorithms that will be described herein. In addition, the computing system 112 may also include various other suitable components, such as a communications circuit or module, one or more input/output channels, a data/control bus and/or the like.

The various functions of the computing system 112 may be performed by a single processor-based device or may be distributed across any number of processor-based devices, in which instance such devices may be considered to form part of the computing system 112. For instance, the functions of the computing system 112 may be distributed across multiple application-specific controllers or computing devices, such as an implement controller, an engine controller, a transmission controller, and/or the like. Furthermore, the communication link 114 may correspond to a single communicative link (e.g., a CAN bus) or a plurality of communicative links (e.g., CAN bus and ISOBUS).

In addition, the system 100 may also include a user interface 120. More specifically, the user interface 120 may be configured to provide feedback from the computing system 112 (e.g., feedback associated with plugging of the disk gangs 44) to the operator. As such, the user interface 120 may include one or more feedback devices (not shown), such as display screens, speakers, warning lights, and/or the like, which are configured to provide feedback from the computing system 112 to the operator. As such, the user interface 120 may, in turn, be communicatively coupled to the computing system 112 via the communicative link 114 to permit the feedback to be transmitted from the computing system 112 to the user interface 120. Furthermore, some embodiments of the user interface 120 may include one or more input devices, such as touchscreens, keypads, touchpads, knobs, buttons, sliders, switches, mice, microphones, and/or the like, which are configured to receive inputs from the operator. In one embodiment, the user interface 120 may be mounted or otherwise positioned within the cab 22 of the work vehicle 12. However, in alternative embodiments, the user interface 120 may mounted at any other suitable location.

Figure 5:
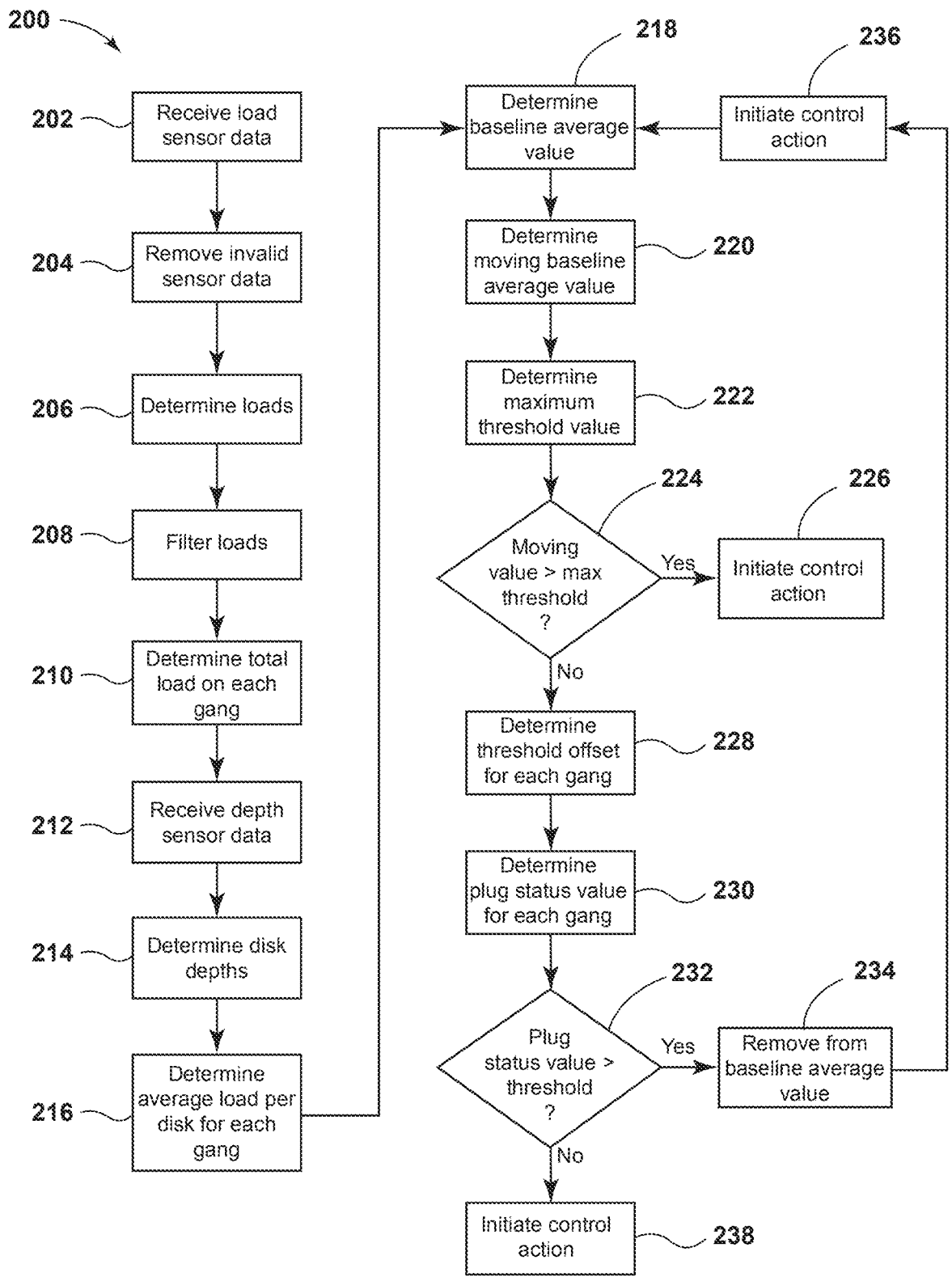
FIG. 5 illustrates a flow diagram providing one embodiment of control logic for detecting disk gang plugging on a tillage implement in accordance with aspects of the present subject matter.

Referring now to FIG. 5, a flow diagram of one embodiment of control logic 200 that may be executed by the computing system 112 (or any other suitable computing system) for detecting disk gang plugging on a tillage implement is illustrated in accordance with aspects of the present subject matter. Specifically, the control logic 200 shown in FIG. 5 is representative of steps of one embodiment of an algorithm that can be executed to detect disk gang plugging on a tillage implement without requiring substantial computing resources and/or processing time. However, in other embodiments, the control logic 200 may be used in association with any other suitable system, application, and/or the like for detecting disk gang plugging on a tillage implement.

As shown in FIG. 5, at (202), the control logic 200 includes receiving load sensor data indicative of the loads acting on a plurality of disk gangs of a tillage implement. Specifically, as mentioned above, in several embodiments, the computing system 112 may be communicatively coupled to the load sensors 108 via the communicative link 114. In this respect, as the implement/vehicle 10/12 travel across the field to perform a tillage operation thereon, the computing system 112 may receive data from the load sensors 108. Such data may, in turn, be indicative of the loads being applied to the disk gangs 44, such as due to the engagement between the disk gangs 44 and the soil in the field.

Furthermore, at (204), the control logic 200 includes removing or invalid load sensor data. Specifically, in several embodiments, the computing system 112 may be configured to analyze the load sensor data received at (202) to determine whether any of the received data is invalid. Invalid sensor data corresponds to any sensor data that cannot be accurate, such as sensor data that is outside of the normal operating range of the load sensors 108. As such, invalid data received from a given load sensor 108 may indicate that the given load sensor 108 is damaged or otherwise not operating correctly. When the computing system 112 determines that the data from a load sensor 108 is invalid, the computing system 112 removes or otherwise disregards such invalid sensor data when performing the remainder of the control logic 200.

Additionally, at (206), the control logic 200 includes determining the loads being applied to the disk gangs based on the received valid load sensor data. Specifically, in several embodiments, the computing system 112 is configured to determine a load value for each load sensor 108 generating valid data based on the data received from the corresponding load sensor 108. For example, in one embodiment, the computing system 112 may access a look-up table(s) stored within its memory device(s) 118 that correlates the received load sensor data to a load value.

Moreover, at (208), the control logic 200 includes filtering the determined loads. Specifically, in several embodiments, the computing system 112 may be configured to apply one or more filters to the load values being determined at (206). Such filter(s) may, in turn, remove outliers or other temporary spikes in the load values, such as those spikes cause by contact between the disks 46 and rocks or other impediments within the field. For example, in one embodiment, the computing system 112 may be configured to apply a median filter to the load values being determined at (206).

In addition, at (210), the control logic 200 includes determining the total load being applied to each disk gang. Specifically, in several embodiments, the computing system 112 may be configured to determine the total load being applied to each disk gang 44. For example, as mentioned above, in some embodiments, each disk gang 44 may include first and second load sensors 108A, 108B. In such embodiments, the computing system 112 may determine the total load on a given disk gang 44 by summing both load values determined from the sensor data received from its first and second sensors 108A, 108B. However, in alternative embodiments, the computing system 112 may determine the total load being applied to each disk gang 44 in any other suitable manner.

As shown, in FIG. 5, at (212), the control logic 200 includes receiving depth sensor data indicative of depths of the plurality of disk blades of the plurality of disk gangs. Specifically, as mentioned above, in several embodiments, the computing system 112 may be communicatively coupled to the depth sensors 110 via the communicative link 114. In this respect, as the implement/vehicle 10/12 travel across the field to perform a tillage operation thereon, the computing system 112 may receive data from the depth sensors 110. Such data may, in turn, be indicative of the depths to which the disks 46 of each disk gang 44 have penetrated into the soil of the field.

Furthermore, at (214), the control logic 200 includes determining the depths of the disks of the disk gangs based on the received depth sensor data. Specifically, in several embodiments, the computing system 112 is configured to determine a depth value for the disks 46 of each disk gang 44 based on the data received from the corresponding depth sensor 110. For example, in one embodiment, the computing system 112 may access a look-up table(s) stored within its memory device(s) 118 that correlates the received depth sensor data to a depth value.

Additionally, at (216), the control logic 200 includes determining the average load per disk being applied to each disk gang based on the determined total loads. In several embodiments, the computing system 112 is configured to determine the average load per disk being applied to each disk gang 44 based on the corresponding total load value determined at (214). For example, in some embodiments, when determining the average load per disk for a given disk gang, the computing system 112 may add or otherwise apply a correction factor and a normalized value to the total load being applied to the given disk gang. More specifically, in such embodiments, the computing system 112 adds a normalized value to the total number of the disk 46 present on the given disk gang 44. The normalized value is, in turn, associated the relative sizing of the disks 46 on the given disk gang 44. As such, the normalized value normalizes or otherwise compensates for differently sized disks 46 on the disk gang 44. For example, in one embodiment, the normalized value may be the ratio of the area of soil engagement of one size of disk 46 to the area of soil engagement of the other size(s) of disks 46. When all of the disks 46 on a given disk gang 44 are the same size, there normalized value is not applied. Thereafter, the computing system 112 divides the total load being applied to the given disk gang determined at (214) by a correction factor equal to the sum the total number of disks and the normalized value, thereby providing the average load per disk being applied to each disk gang 44. In this respect, the average load per disk compensates for differences among the disk gangs 44 in the number and/or sizing of the disks 46. Thus, determined average loads per disk allow for comparison of the loads being applied to disk gangs 44 having differing numbers and/or sizes of disks 46. (216) is repeated for every disk gang 44 for which the computing system 112 receives valid load sensor data.

Moreover, at (218), the control logic 200 includes determining the baseline average value of the average loads per disk being applied to the plurality of disk gangs. Specifically, in several embodiments, the computing system 112 may be configured to determine the baseline average value of the average loads per disk being applied to the plurality of disk gangs 44 determined at (216). That is, at (218), the computing system 112 may determine the average value of the average loads per disk for all of the disk gangs 44 for which the computing system 112 has received valid load sensor data.

In addition, at (220), the control logic 200 includes determining a moving baseline average value over a predetermined time period. Specifically, in several embodiments, the computing system 112 may be configured to determine a moving baseline average value over a predetermined time period (e.g., five seconds). That is, at (220), the computing system 112 may determine the average value of the baseline average value determined at (218) over the predetermined time period. As will be described below, the moving baseline average value determined at (220) is used when determining a plug status value for the disk gangs 44, with the plug status value being indicative of the likelihood that the corresponding disk gang 44 is plugged. Thus, the use of the moving baseline average value allows the plug status value to be calibrated to the specific conditions of the field on which the tillage operation is being performed.

As shown in FIG. 5, at (222), the control logic 200 includes determining a maximum baseline threshold value based on the determined depths. Specifically, in several embodiments, the computing system 112 is configured to determine a maximum baseline threshold value based on the depths of the disks 46 determined at (214). The maximum baseline threshold value corresponds to a value of the moving baseline average value at which it is likely that all of the disk gangs 44 on the tillage implement 10 are plugged or will become plugged. For example, in one embodiment, the computing system 112 may access a look-up table(s) stored within its memory device(s) 118 that correlates the depths of the disks 46 to a maximum baseline threshold value.

Furthermore, at (224), the control logic 200 includes comparing the determined moving baseline average value to the determined maximum baseline threshold value. Specifically, in several embodiments, the computing system 112 is configured to compare the moving baseline average value determined at (220) to the maximum baseline threshold value determined at (222). When the moving baseline average value exceeds the maximum baseline threshold value, it is likely that all of the disk gangs 44 on the tillage implement 10 are plugged or will become plugged. In such instances, the control logic 200 proceeds to (226). Conversely, when the moving baseline average value is equal to or falls below the maximum baseline threshold value, it is unlikely that all of the disk gangs 44 on the tillage implement 10 are plugged or will become plugged. In such instances, the control logic 200 proceeds to (228).

At (226), the control logic 200 includes initiating a control action associated with the plurality of disk gangs being plugged. Specifically, in several embodiments, the computing system 112 is configured to initiate one or more control actions associated with all of the disk gangs 44 on the tillage implement 10 being plugged. For example, in one embodiment, the control action(s) include providing a notification to the operator of the implement/vehicle 10/12 that all of the disk gangs 44 are plugged. In such an embodiment, the computing system 112 may transmit suitable control signals to the user interface 120 instructing the user interface 120 to provide the appropriate notification to the operator. Alternatively, or additionally, the control action(s) include reducing the ground speed of the implement/vehicle 10/12. In such an embodiment, the computing system 112 may transmit suitable control signals to the engine 24 and/or transmission 26 of the vehicle 12 instructing the engine 24 and/or transmission 26 to reduce the ground speed of the implement/vehicle 10/12. However, in alternative embodiments, any other suitable control actions may be initiated at (226).

Conversely, at (228), the control logic 200 includes determining a threshold offset value for each disk gang based on the determined depths. Specifically, in several embodiments, the computing system 112 is configured to determine a threshold offset value for each disk gang 44 for which the computing system 112 has received valid load sensor data based on the depths of the disks 46 determined at (214). As mentioned above, the moving baseline average value determined at (220) allows the plug status value to be calibrated to the specific soil conditions of the field on which the tillage operation is being performed. Similarly, the threshold offset value allows the plug status value to be calibrated to the specific penetration depths of the disks 46. For example, in one embodiment, the computing system 112 may access a look-up table(s) stored within its memory device(s) 118 that correlates the depths of the disks to a threshold offset value.

Additionally, at (230), the control logic 200 includes determining a plug status value for each disk gang. Specifically, in several embodiments, the computing system 112 may be configured to determine a plug status value for each disk gang 44. Each plug status value, in turn, provides an indication of how likely the corresponding disk gang 44 is to become plugged.

In general, the plug status values are based on the average loads per disk determined at (216), the moving baseline average value determined at (218), and/or the threshold offset values determined at (228). Specifically, in several embodiments, the computing system 112 may determine the plug status value for a given disk gang 44 based on its average load per disk, its threshold offset value, and the moving baseline average value. For example, in one embodiment, when determining the plug status value for the given disk gang 44, the computing system 112 may divide its average load per disk determined at (216) by the sum of the moving baseline average value determined at (218) and its threshold offset value determined at (228). In this respect, the plug status value for a given disk gang 44 is based on the specific load acting on the given disk gang 44, the specific depth of its disks 46, and the soil conditions of the specific field in which the given disk gang 44 is engaging the soil. In this respect, the plug status value accounts for implement parameters, operational parameters, and field parameters that vary across implements, tillage operations, and fields, thereby providing more accurate plugging determinations than conventional systems.

Moreover, at (232), the control logic 200 includes comparing the determined plug status values to a predetermined plugging threshold value. Specifically, in several embodiments, the computing system 112 is configured to compare the plug status values for each disk gang 44 determined at (230) to a predetermined plugging threshold value. When the plug status value for a given disk gang 44 exceeds the predetermined plugging threshold value, it is likely that the given disk gang 44 is plugged. In such instances, the control logic 200 proceeds to (234). Conversely, when the plug status value for the given disk gang 44 is equal to or falls below the predetermined plugging threshold value, it is unlikely that the given disk gang 44 is plugged. In such instances, the control logic 200 proceeds to (238).

At (234), the control logic 200 includes removing the average load per disk of a given disk gang from the baseline average value when the plug status value for the given disk gang exceeds predetermined plugging threshold value. Specifically, in several embodiments, the computing system 112 is configured to remove the average load per disk for any disk gang 44 having a plug status value exceeding the predetermined plugging threshold value. Removing the average loads per disk for any disk gang 44 that is plugged from the baseline average value allows the moving baseline average value to be calibrated to the field, thereby providing an indication of the types of loads that are to be expected to act on the disk gangs 44 in that field without causing plugging.

In addition, at (236), the control logic 200 includes initiating a control action associated with the given disk gang being plugged. Specifically, in several embodiments, the computing system 112 is configured to initiate one or more control actions associated with the given disk gang 44 being plugged. For example, in one embodiment, the control action(s) include providing a notification to the operator of the implement/vehicle 10/12 that the given disk gang 44 is plugged. In such an embodiment, the computing system 112 may transmit suitable control signals to the user interface 120 instructing the user interface 120 to provide the appropriate notification to the operator. In another embodiment, the control action(s) include reducing the ground speed of the implement/vehicle 10/12. In such an embodiment, the computing system 112 may transmit suitable control signals to the engine 24 and/or transmission 26 of the vehicle 12 instructing the engine 24 and/or transmission 26 to reduce the ground speed of the implement/vehicle 10/12. In a further embodiment, the control action(s) include adjusting the position of the given disk gang 44 relative to the implement frame 28. In such an embodiment, the computing system 112 may transmit suitable control signals to the disk gang actuators 102 of the implement 10 instructing the disk gang actuators 102 to adjust position of the given disk gang 44 relative to the implement frame 28. However, in alternative embodiments, any other suitable control actions may be initiated at (236). Thereafter, the control logic 200 proceeds to (218).

As shown in FIG. 5, at (238), the control logic 200 includes initiating a control action based on the determined plug status values. Specifically, in several embodiments, the computing system 112 is configured to initiate one or more control actions based on the plug status values determined at (230). For example, in one embodiment, the control action(s) include providing a notification to the operator of the implement/vehicle 10/12 indicating the plug status values for each disk gang 44. In such an embodiment, the computing system 112 may transmit suitable control signals to the user interface 120 instructing the user interface 120 to provide the appropriate notification to the operator. In another embodiment, the control action(s) include adjusting the ground speed of the implement/vehicle 10/12. In such an embodiment, the computing system 112 may transmit suitable control signals to the engine 24 and/or transmission 26 of the vehicle 12 instructing the engine 24 and/or transmission 26 to adjust the ground speed of the implement/vehicle 10/12. In a further embodiment, the control action(s) include adjusting the position of the given disk gang 44 relative to the implement frame 28. In such an embodiment, the computing system 112 may transmit suitable control signals to the disk gang actuators 102 of the implement 10 instructing the disk gang actuators 102 to adjust position of the given disk gang 44 relative to the implement frame 28. However, in alternative embodiments, any other suitable control actions may be initiated at (238).

In several embodiments, at (238), the control actions may be tiered. For example, in some embodiments, when the plug status value for a given disk gang 44 falls within a first range, the computing system 112 may initiate a first control action (e.g., a notification of the plug status value of the given disk gang). Furthermore, in such an embodiment, when the plug status value for the given disk gang 44 falls within a second range that is greater than the first range, the computing system 112 may initiate a second control action (e.g., a notification or alert that the given disk gang 44 is plugged). The second control action may be in addition to or in lieu of the first control action. Additionally, in such an embodiment, when the plug status value for the given disk gang 44 falls within a third range that is greater than the second range, the computing system 112 may initiate a third control action (e.g., an active control action associated with adjusting the operation of the given disk gang 44). The third control action may be in addition to or in lieu of the first and/or second control actions. Thus, in one embodiment, when the plug status value for a given disk gang 44 falls within a third range, the first, second, and third control actions may all be initiated. Conversely, in another embodiment, when the plug status value for a given disk gang 44 falls within a third range, only the third control action may all be initiated.

Figure 6:
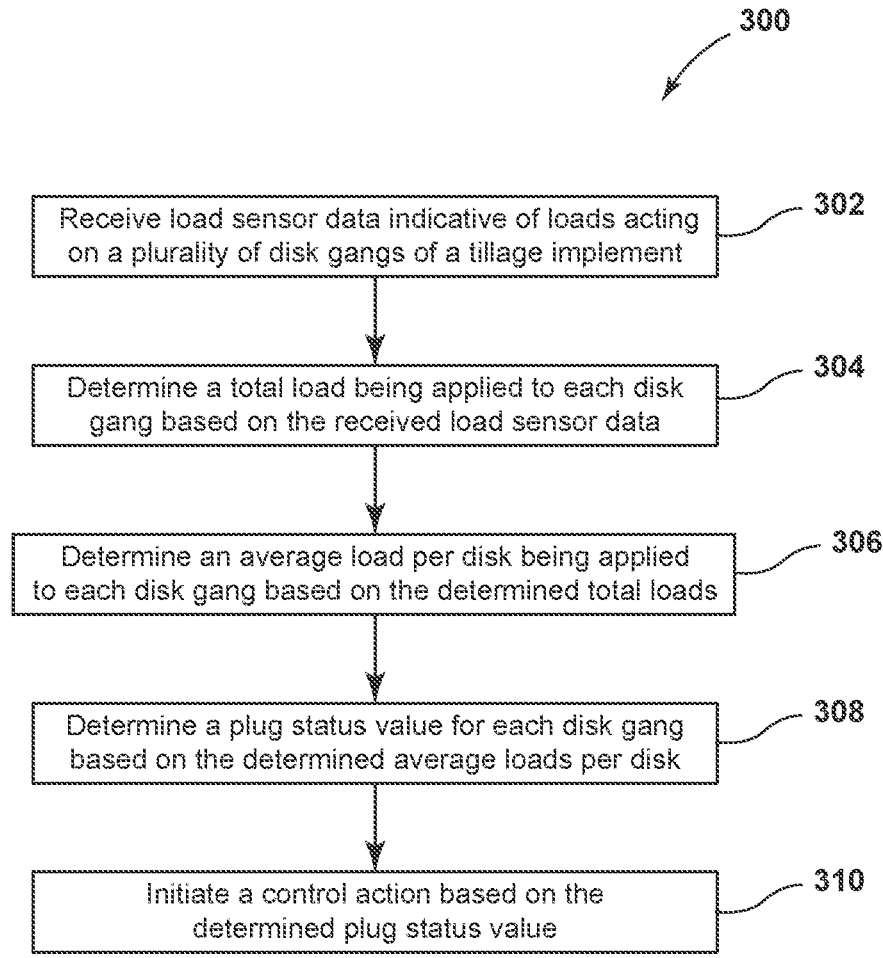
FIG. 6 illustrates a flow diagram of one embodiment of a method for detecting disk gang plugging on a tillage implement in accordance with aspects of the present subject matter.

Referring now to FIG. 6, a flow diagram of one embodiment of a method 300 for detecting disk gang plugging on a tillage implement is illustrated in accordance with aspects of the present subject matter. In general, the method 300 will be described herein with reference to the tillage implement 10 and the system 100 described above with reference to FIGS. 1-5. However, it should be appreciated by those of ordinary skill in the art that the disclosed method 300 may generally be implemented with any tillage implements having any suitable implement configuration, work vehicles having any suitable vehicle configuration, and/or within any system having any suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (302), the method 300 includes receiving, with a computing system, load sensor data indicative of loads acting on a plurality of disk gangs of a tillage implement. For instance, as described above, the computing system 112 may be configured to receive load sensor data from the plurality of load sensors 108. The received load sensor data is, in turn, indicative of loads acting on the plurality of disk gangs 44 of the tillage implement 10.

Additionally, at (304), the method 300 includes determining, with the computing system, a total load being applied to each disk gang based on the received load sensor data. For instance, as described above, the computing system 112 may be configured to determine a total load being applied to each disk gang 44 based on the received load sensor data.

Moreover, as shown in FIG. 6, at (306), the method 300 includes determining, with the computing system, an average load per disk being applied to each disk gang based on the determined total loads. For instance, as described above, the computing system 112 may be configured to determine the average load per disk being applied to each disk gang 44 based on the determined total loads.

Furthermore, at (308), the method 300 includes determining, with the computing system, a plug status value for each disk gang based on the determined average loads per disk. For instance, as described above, the computing system 112 may be configured to determine a plug status value for each disk gang 44 based on the determined average loads per disk.

In addition, as shown in FIG. 6, the method 300 includes initiating, with the computing system, a control action based on the determined plug status values. For instance, as described above, the computing system 112 may be configured to initiate one or more control actions based on the determined plug status values. Such control action(s) may include providing a notification to the operator of the implement/vehicle 10/12, adjusting the ground speed of the implement/vehicle 10/12, adjusting the position of one or more disk gangs 44 relative to the implement frame 28, and/or the like.

It is to be understood that the steps of the control logic 200 and the method 300 are performed by the computing system 112 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 112 described herein, such as the control logic 200 and the method 300, is implemented in software code or instructions which are tangibly stored on a tangible computer readable medium. The computing system 112 loads the software code or instructions via a direct interface with the computer readable medium or via a wired and/or wireless network. Upon loading and executing such software code or instructions by the computing system 112, the computing system 112 may perform any of the functionality of the computing system 112 described herein, including any steps of the control logic 200 and the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A tillage implement, comprising:
   a frame;
   a plurality of disk gangs supported on the frame, each disk gang including a disk gang shaft and a plurality of disks spaced apart from each other along the disk gang shaft;
   a plurality of load sensors configured to generate data indicative of loads being applied to the plurality of disk gangs;
   a plurality of depth sensors configured to generate data indicative of depths of the plurality of disk blades of the plurality of disk gangs; and
   a computing system communicatively coupled to the plurality of load sensors and the plurality of depth sensors, the computing system configured to:
      determine a total load being applied to each disk gang based on the data generated by the plurality of load sensors;
      determine an average load per disk being applied to each disk gang based on the determined total loads;
      determine a baseline average value of the average loads per disk being applied to the plurality of disk gangs;
      determine a moving baseline average value over a predetermined time period;
      determine the depths of the plurality of disk blades of the plurality of disk gangs based on the data generated by the plurality of the depth sensors;
      determine a threshold offset for each disk gang based on the determined depths; and
      determine a plug status value for each disk gang based on the determined average loads per disk, the moving baseline average value, the average loads per disk, and the threshold offsets.

2. The tillage implement of claim 1, further comprising:
   a plurality of hangers, wherein a given disk gang of the plurality of disk gangs is coupled to the frame via first and second hangers of the plurality of hangers.

3. The tillage implement of claim 2, wherein, for the given disk gang, a first load sensor of the plurality of load sensors is coupled between the first hanger and the disk gang shaft and a second load sensor of the plurality of load sensors is coupled between the second hanger and the disk gang shaft.

4. A system for detecting disk gang plugging on a tillage implement, the system comprising:
   an implement frame;
   a plurality of disk gangs supported on the implement frame, each disk gang including a disk gang shaft and a plurality of disks spaced apart from each other along the disk gang shaft;
   a plurality of load sensors configured to generate data indicative of loads being applied to the plurality of disk gangs;
   a plurality of depth sensors configured to generate data indicative of depths of the plurality of disk blades of the plurality of disk gangs; and
   a computing system communicatively coupled to the plurality of load sensors and the plurality of depth sensors, the computing system configured to:
      determine a total load being applied to each disk gang based on the data generated by the plurality of load sensors;
      determine an average load per disk being applied to each disk gang based on the determined total loads;
      determine a baseline average value of the average loads per disk being applied to the plurality of disk gangs;
      determine a moving baseline average value over a predetermined time period;
      determine the depths of the plurality of disk blades of the plurality of disk gangs based on the data generated by the plurality of the depth sensors;
      determine a threshold offset for each disk gang based on the determined depths; and
      determine a plug status value for each disk gang based on the determined average loads per disk, the moving baseline average value, the average loads per disk, and the threshold offsets.

5. The system of claim 4, wherein the computing system is further configured to:
   compare the determined plug status value for each disk gang to a predetermined plugging threshold value; and
   remove the average load per disk of a given disk gang of the plurality of disk gangs from the baseline average value when the plug status value for the given disk gang exceeds predetermined plugging threshold value.

6. The system of claim 4, wherein the computing system is further configured to:
   determine a maximum baseline threshold based on the determined depths;
   compare the determined moving baseline average value to the determined maximum baseline threshold; and
   when the determined moving baseline average value exceeds the determined maximum baseline threshold, initiate a control action associated with the plurality of disk gangs being plugged.

7. The system of claim 4, wherein the computing system is further configured to initiate a control action associated with a given disk gang of the plurality of disk gang based on the plug status value for the given disk gang.

8. The system of claim 7, wherein the control action comprises providing a notification to an operator.

9. The system of claim 4, wherein, when determining the average load per disk for each disk gang, the computing system is further configured to apply a correction factor associated with a number of disks present on each disk gang.

10. The system of claim 4, wherein, when determining the average load per disk for each disk gang, the computing system is further configured to apply a normalized value associated a relative sizing of the plurality of disks on each disk gang.

11. The system of claim 4, wherein the computing system is further configured to apply a filter to the determined total load being applied to each disk gang.

12. A method for detecting disk gang plugging on a tillage implement, the tillage implement including a plurality of disk gangs, each disk gang including a plurality of disks, the method comprising:
- receiving, with a computing system, load sensor data indicative of loads acting on the plurality of disk gangs;
- determining, with the computing system, a total load being applied to each disk gang based on the received load sensor data;
- determining, with the computing system, an average load per disk being applied to each disk gang based on the determined total loads;
- determining, with the computing system, a baseline average value of the average loads per disk being applied to the plurality of disk gangs;
- determining, with the computing system, a moving baseline average value over a predetermined time period;
- receiving, with the computing system, depth sensor data indicative of depths of the plurality of disk blades of the plurality of disk gangs;
- determining, with the computing system, the depths of the plurality of disk blades of each disk gang based on the received depth sensor data;
- determining, with the computing system, a threshold offset for each disk gang based on the determined depths;
- determining, with the computing system, a plug status value for each disk gang based on the determined average loads per disk, the moving baseline average value, the average loads per disk, and the threshold offsets; and
- initiating, with the computing system, at least one of an adjustment to a ground speed of the tillage implement or a position of a given disk gang of the plurality of disk gangs relative to a frame of the tillage implement based on the determined plug status values.

13. The method of claim 12, further comprising:
- comparing, with the computing system, the determined plug status value for each disk gang to a predetermined plugging threshold value; and
- removing, with the computing system, the average load per disk of a given disk gang of the plurality of disk gangs from the baseline average value when the plug status value for the given disk gang exceeds predetermined plugging threshold value.

14. The method of claim 12, wherein the control action corresponds to a first control action, the method further comprising:
- determining, with the computing system, a maximum baseline threshold based on the determined depths;
- comparing, with the computing system, the determined moving baseline average value to the determined maximum baseline threshold; and
- initiating a second control action associated with the plurality of disk gangs being plugged when the determined moving baseline average value exceeds the determined maximum baseline threshold.

* * * * *